April 24, 1956 W. A. RAY 2,742,919
ELECTROMAGNETICALLY OPERATED BALANCED PILOT VALVE
Filed June 30, 1951 6 Sheets-Sheet 1

WILLIAM A. RAY,
INVENTOR.

BY
ATTORNEYS

April 24, 1956

W. A. RAY 2,742,919

ELECTROMAGNETICALLY OPERATED BALANCED PILOT VALVE

Filed June 30, 1951

WILLIAM A. RAY,
INVENTOR.

BY Lyon&Lyon
ATTORNEYS

Fig. 4.

April 24, 1956 W. A. RAY 2,742,919
ELECTROMAGNETICALLY OPERATED BALANCED PILOT VALVE
Filed June 30, 1951 6 Sheets-Sheet 6

WILLIAM A. RAY, INVENTOR.

BY Lyon+Lyon
ATTORNEYS

United States Patent Office 2,742,919
Patented Apr. 24, 1956

2,742,919

ELECTROMAGNETICALLY OPERATED BALANCED PILOT VALVE

William A. Ray, North Hollywood, Calif., assignor to General Controls Co., Glendale, Calif., a corporation of California Application June 30, 1951, Serial No. 234,618

21 Claims. (Cl. 137—330)

The present invention relates to hydraulically operated systems and valves particularly useful for operation at very high pressures of, for example, 3000 pounds per square inch.

In general, the present arrangement contemplates a balanced pilot valve for controlling the flow of fluid to a selector valve, the selector valve in turn serving to control the flow of fluid to opposite sides of a double acting piston, which piston may be connected to, for example, a control element on aircraft such as the aircraft flaps for controlling aircraft flight. The selector valve shown herein is of the type described and claimed in my copending patent applications Serial No. 171,071, filed June 29, 1950, now United States Patent 2,671,837, and Serial No. 197,209, filed November 24, 1950, which, if desired, may be used for the selector valve shown herein, although the selector valve shown herein is preferred in the present installation because of certain improved features thereof such as condensation in length, the elimination of the cylinder which carries the slide ports and incorporation herein of Y-shaped flow passageways into and from the slide ports, and the streamlined design of the port retainers. While certain subsidiary features of the present invention are directed to such improvements in the main selector valve, the more important features of the present invention reside in the use of a pilot valve of the character described herein for controlling the selector valve and further reside in the specific structure of the different pilot valves described herein.

It is therefore an object of the present invention to provide an improved hydraulically operated control system of this character which employs a pilot valve for controlling the flow of fluid to a selector valve and also for providing improved selector valve and pilot valve constructions.

A specific object of the present invention is to provide a pilot valve which requires a very small amount of energy to operate the same yet the valve has fluid-tight connections for withstanding pressures in the order of 3000 pounds per square inch.

Another specific object of the present invention is to provide an improved pilot valve which has a balanced action and which avoids the use of O-ring seals through which the valve is required to be moved for effecting its operation, thereby greatly minimizing frictional resistances to motion of the movable valve element and thereby providing a valve which is more consistent and predictable in its operation.

Another specific object of the present invention is to provide an improved pilot valve featured by the fact that the movable valve element, a tubular element, sweeps over a portion of the cooperating valve seat, the valve seat having a substantially spherical surface, and the tubular element being pivoted so that its extremity swings generally along the arc of a circle.

Another specific object of the present invention is to provide an improved pilot valve construction of the character mentioned in the preceding paragraph characterized further by the fact that means are provided for causing lapping of the extremity of the tubular element with the spherical valve seat in use of the valve.

Another specific object of the present invention is to provide an improved pilot valve of this character in which a pivoted tubular element is allowed to rotate about its own axis when it is operated, i. e., pivoted to different operating positions.

Another specific object of the present invention is to provide an improved pilot valve construction of this character in which the pivoted tubular element is prevented from rotating about its own axis while being operated, i. e., pivoted to different operating positions.

Another specific object of the present invention is to provide an improved pilot valve of this character in which the pivoted tubular element is caused to rotate about its own axis when it is operated, i. e., pivoted to different operating positions.

Another specific object of the present invention is to provide an improved pilot valve of this character which incorporates means for adjusting the sweep position, the sweep travel, and the neutral position of the movable valve element in such a manner that production cost and field maintenance are reduced.

Another specific object of the present invention is to provide an improved hydraulically operated system of this character which is light in weight and yet reliable.

Another specific object of the present invention is to provide an improved pilot valve of this character featured by the fact that substantially all hydraulic forces acting on the pivoted tubular element are balanced out.

Another specific object of the present invention is to provide an improved pilot valve which is electromagnetically operated using unique simple structural arrangements whereby safe operating conditions may be realized.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1:
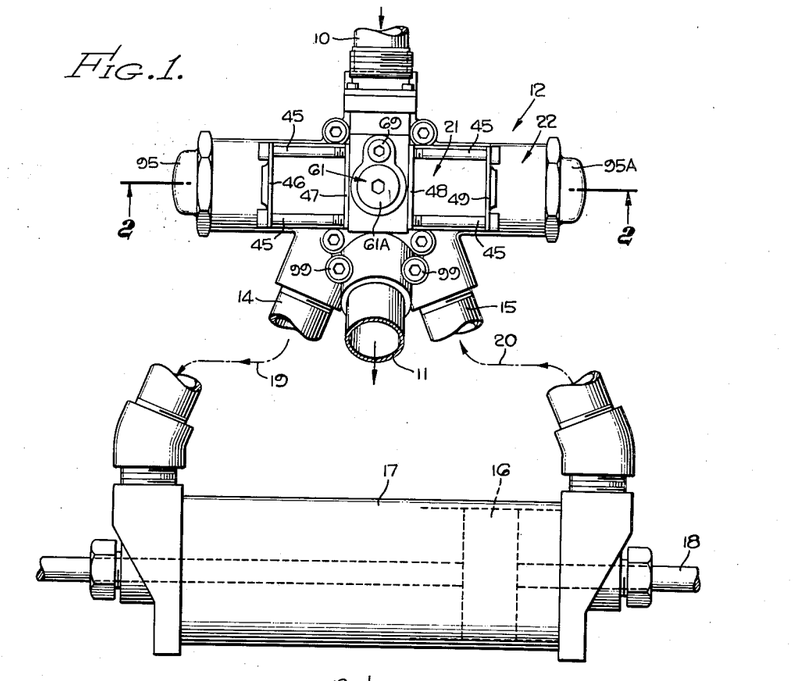
Figure 1 is a view in elevation showing, in the upper portion thereof, a housing for both the pilot and the selector valves, and showing, in the lower portion thereof, the double acting piston cylinder assembly, the position of the piston being controlled in accordance with controlled flow of fluid from the conduits in the housing in the upper portion.

Referring to Figure 1, fluid such as oil under pressure of, for example, 3000 pounds per square inch is conducted to the high pressure conduit 10. This high pressure conduit 10 may be connected to the outlet of a high pressure pump (not shown), the inlet of the pump being connected, in conventional manner, to a sump or reservoir (not shown) into which the return conduit 11 drains. Since it is understood that such pump and reservoir arrangement is conventional in the art and since the pump and reservoir per se form no part of the present invention, no detailed description of the same is necessary. These conduits 10, 11 are threaded in the unitary housing 12 which may be either a casting or a forging, properly machined, with conduits 14, 15 extending therefrom. These conduits 14, 15 are in communication with opposite sides of the movable piston 16 which is disposed in the cylinder 17. The piston 16 is thus double acting, and the piston rod 18 thereof which extends through the cylinder 17 may be connected to a movable flight controlling element of an aircraft such as the aircraft flap for controlling the position of such flap. The valving arrangement whereby the flow of fluid in the conduits 14, 15 may be in the direction indicated by the arrows 19, 20 in Figure 1, or in opposite directions from those indicated by the arrows, or whereby such flow of fluid may be prevented, is described in detail hereinafter. Such valving arrangement, in general, constitutes a selector valve which controls the flow of fluid to the conduits 14, 15, but the selector valve in turn is controlled by a solenoid actuated pilot valve. The pilot valve is shown in the upper portion of Figure 2 and is indicated generally by the reference number 21, while the selector valve is shown in the lower portion of Figure 2 and is indicated by the general reference number 22.

As alluded to above, the selector valve 22 may be of the type described in my aforementioned copending patent applications Serial No. 171,071, now United States Patent 2,671,837, and Serial No. 197,209, but the one shown herein is preferred.

Figure 2:
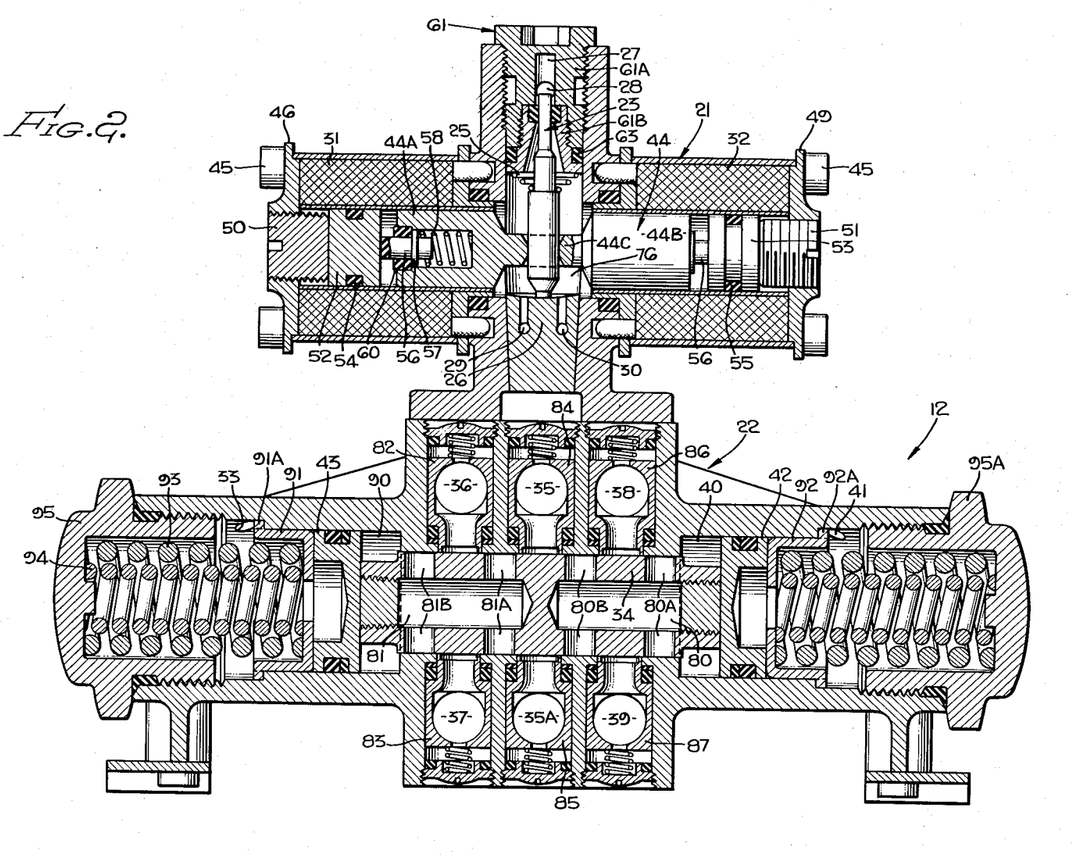
Figure 2 is a sectional view taken substantially on the line 2—2 of Figure 1 and shows the pivoted tubular valve element of the pilot valve in its neutral position.
Figure 3:
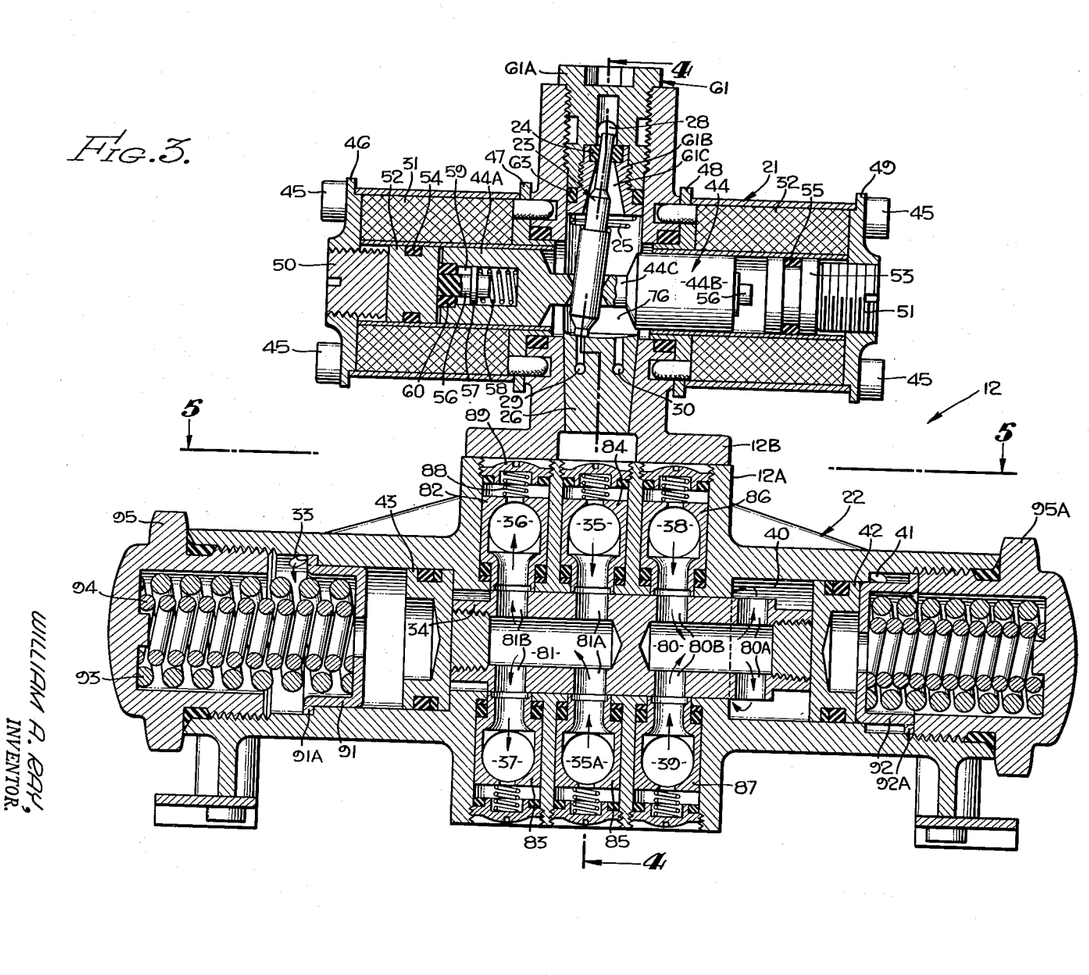
Figure 3 corresponds to a sectional view as shown in Figure 2 but with the pivoted tubular element of the pilot valve displaced from its neutral position for transmitting pressure to the selector valve.
Figure 4:
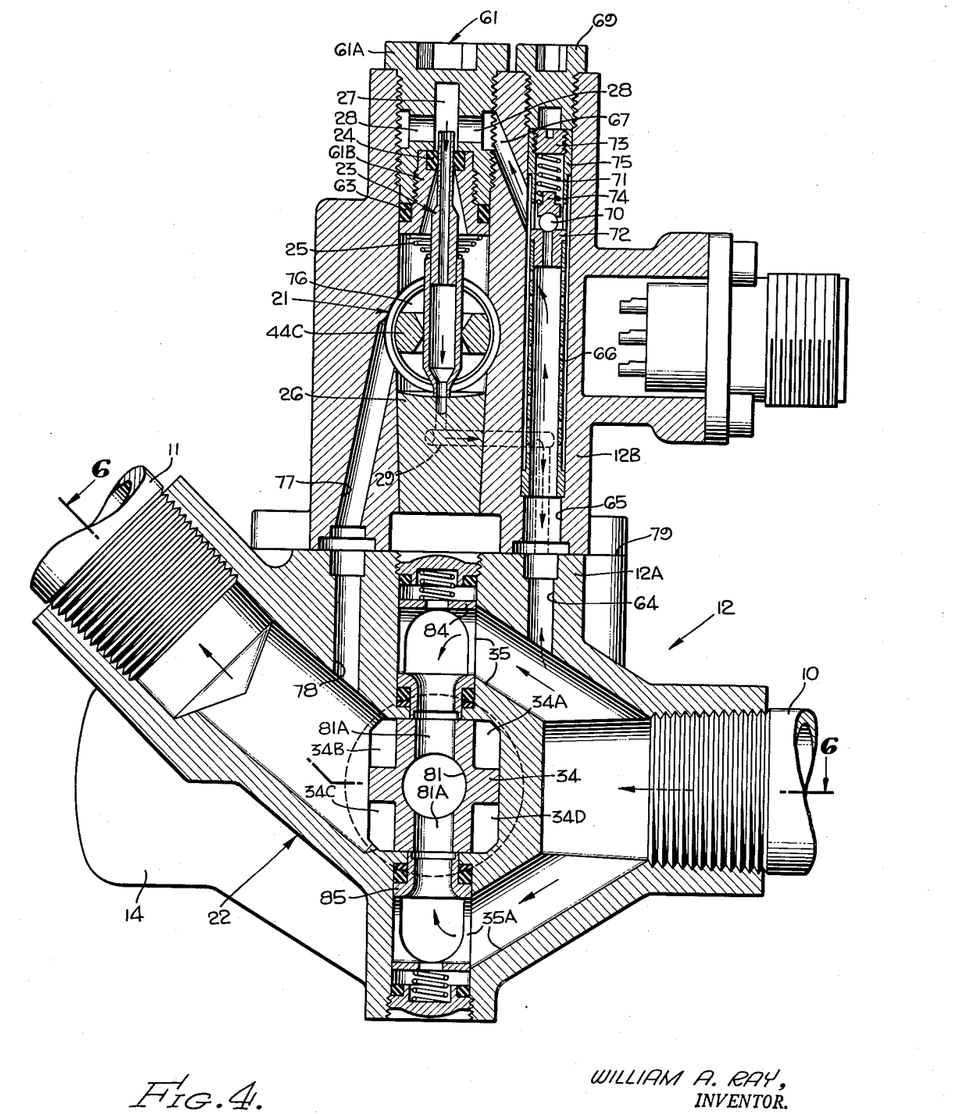
Figures 4 and 5 are views taken in the directions indicated by the lines 4—4 and 5—5, respectively, of Figure 3.
Figure 5:
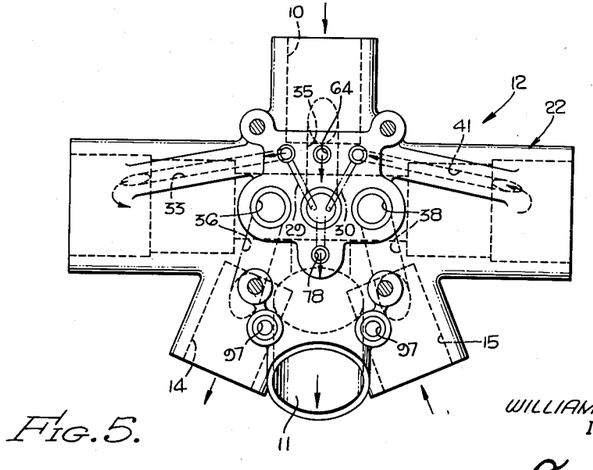

The pilot valve 21 consists essentially of a tubular element or so-called sweep 23 which, as shown in Figure 2, is pivoted at its upper end in the O-ring 24, Figure 3, such tubular element 23 being pressed downwardly by the prestressed coil compression spring 25 into engagement with the upper spherical surface of the valve seat 26. The tubular element 23 of course is open at each end as indicated in Figure 4, the tubular element 23 being thus always in constant communication with the high pressure cavity 27 (Figure 2), such cavity being in communication with the high pressure port 28. As shown in Figure 2, the lower end of the tubular element 23 resiliently abuts the valve seat 26, in its neutral position, to prevent the leakage of oil; however, such pivoted tubular element or sweep 23 may be pivoted in its resilient support 24 to assume registry with either port 29 or port 30 in the valve seat 26, upon energizing either solenoid 31 or 32, respectively. When neither solenoid 31 or 32 is energized, the tubular element 23 assumes its neutral position as shown in Figure 2, but when solenoid 31 is energized, the tubular element 23 assumes the position shown in Figure 3. In the neutral position of the pivoted sweep 23, the selector valve 22 of course is in its neutral position as shown in Figure 2; however, when the pivoted sweep 23 is moved to the position shown in Figure 3, oil under pressure flows from the high pressure conduit 28, through the tubular conduit 23, through the port 29 and through the port 33 to cause the valve element 34 to slide to the right in Figure 3, thereby allowing the escape of high pressure fluid from the conduit 35. The oil which thus enters through port 33 and which flows from the high pressure conduit 35 flows into the ports 36, 37, each of which is in communication with the conduit 14 (Figure 1) with the result that there is a flow of oil to the cylinder 17 (Figure 1 as indicated by the arrow 19) to thereby cause movement of the piston 16 to the right in Figure 1. The oil thus displaced flows in the direction indicated by the arrow 20 into the conduit 15. The conduit 15 is in constant communication with the ports 38, 39. In this stage, as shown in Figure 3, since the valve element 34 is displaced to the right, the oil flows from the conduits 38, 39 radially inwardly into a central bore of the valve 34 into the annular space 40, such annular space 40 being in communication, as perhaps more clearly indicated in Figure 6, with the return conduit 11, the conduit 11, as described in connection with Figure 1, being in communication with the sump or reservoir of the pumping system. It is observed that the port 41, shown in the lower right-hand portion of Figures 2 and 3, is in constant communication with the port 30 in the valve seat 26, but the flow of oil to such conduit 41 under the conditions shown in Figure 3 is blocked by the piston 42 which is attached to the movable valve element 34. It is further observed that the other end of the valve element 34 has connected thereto a similar piston 43 for blocking the flow of oil to the conduit 33 when the valve element 23 is in its other actuated position, i. e., when the pilot sweep 23 is in communication with the port 30.

Now that the oil flow circuits have been briefly described, the specific nature of such oil circuits may be ascertained more accurately from the following description. Before commencing with such description, however, the solenoids for operating the pivoted sweep 23 are now described. The solenoid coils 31, 32 are coaxially mounted on the housing 12 so as to slidably receive a common core member 44 having enlarged spaced cylindrical portions 44A, 44B joined by a generally rectangular apertured web portion 44C. The tubular valve element 23 passes through the apertured portion of the web 44C and is engaged by the innermost portion of the conically shaped wall defining such aperture. The coils 31, 32 may be supported on the housing 12 by a series of bolts 45 (Figures 3 and 1) which have their inner ends threaded into tapped holes in the housing 12, the coil 31 being thus clamped between spaced rings 46, 47 (Figure 3) and the coil 32 being clamped between spaced rings 48, 49. The outer rings 46, 49 are internally threaded to receive the threaded plugs 50, 51, respectively, which are joined with a cylindrical portion 52, 53, respectively, in which suitable oil sealing annular gaskets 54, 55 are disposed. These cylindrical portions 52, 53 serve as adjustably positioned stop elements for the common armature 44. In order to dissipate shock forces, each of the cylindrical cores 44A, 44B carry a spring biased plunger 56 of the character shown in Figures 2 and 3. The plunger 56 carries an annular shoulder 57 against which one end of the coil compression spring 58 bears, the other end of the spring 58 bearing against the core 44A. The plunger 56 is retained in the cylindrical apertured portion in the core 44A by the annular retaining ring 60. The spring pressed plunger 56 in the core 44B is identical with the one described in core 44A.

As mentioned previously the tubular valve element 23 is supported at its upper end in the O-ring 24. The O-ring 24 is retained between the two halves 61A, 61B of the threaded removable plug having the general reference numeral 61. The plug 61 may be removed as a unit and is screw-threaded in the housing 12. The plug 61 has an aforementioned cavity 27 (Figure 4) which is constantly in communication with the high pressure port 28. The plug half 61B has a tapered opening axially disposed therein to allow pivoted movement of the valve element 23. An O-ring 63 may be disposed between the plug halves 61A, 61B so as to resiliently engage the bore of the housing 12 and provide a fluid-tight joint. The valve seat 26 is tapered and has its upper surface hardened and fits into a tapered hole in the housing 12, such tapered hole being axially aligned with the plug 61 for assembly and removal purposes. It is thus noted that the coil compression spring 25, while serving essentially to press the movable valve member 23 into its engagement with its seat 26, assures proper positioning of the tapered valve seat 26 in the tapered hole in the housing 12.

The manner in which oil under pressure is delivered to the upper end of the pivoted valve element 23 is perhaps best seen in Figure 4. Oil under pressure delivered to conduit 10 is always free to flow to the port 28. The conduit 10 screwed in the housing 12 is in communication with the port 28 through the following path which includes: the bore 64 in the lower half 12A of the housing 12, the enlarged bore 65 in the upper half 12B of the housing 12 within which is retained the filter screen 66 through which filtered oil normally flows to the angularly disposed bore 67, the upper end of which constitutes the port 28. The filter screen 66 is perforated and bottoms in Figure 4 against an annular shoulder in the bore 65. The screen 66 may be inserted and replaced since the removable plug 69 is provided for that purpose. In the event that the filter screen 66 becomes clogged, pressure builds up within the screen 66 to cause the spring biased ball 70 to open to thereby allow a continued flow of oil. The ball 70 is pressed by coil compression spring 71 into engagement with its seat 72. One end of the spring 71 abuts against the threaded plug 73 and the other end of the spring abuts against the pressure plate 74 which actually contacts the ball 70. The plug 73 is screw-threaded in the annular sleeve 75 which is retained by the plug 69. This oil path, which includes the bore 64, 65 is essentially in parallel with a second oil flow path which includes the ports or conduits 35 and 35A (Figures 4 and 3). It is observed in Figure 4 that the region 76 surrounding the lower portion of the pivoted valve element 23 is in communication through the serially connected discharge conduits 77, 78 with the return conduit 11 so that any oil that leaks as a result of an imperfect seal between the valve element 23 and its seat 26 is returned to the return line 11 through the conduits 77, 78. It is thus observed that all of the elements of the pilot valve, including valve element 23, are contained in the upper housing half 12B which is secured to the lower housing half 12A along the parting line 79 (Figure 4) by means of suitable bolts. The lower housing half 12A serves as a housing for the selector valve, details of which are now described.

As mentioned previously the selector valve includes the slidable valve element 34 which has connected at opposite ends thereof piston elements 42 and 43, the piston elements 42, 43 serving not only as piston elements but also as barriers, in different instances, for oil flow. The valve element 34 is essentially square in cross-section, as shown in Figure 4, with suitable axial and transverse openings in the same. Specifically, the valve element 34 includes two separate axially aligned bores 80, 81 (Figure 3) which are closed at each end but are in communication at all times with the corresponding laterally extending bores 80A, 80B and 81A, 81B, respectively. This valve element 34 cooperates with six spring pressed valve seats 82, 83, 84, 85, 86, 87, each of which are mounted in the housing half 12A in the same manner which is now described with respect to the valve seat 82.

The valve seat 82 is pressed downwardly in Figure 3 by the coil compression spring 88, one end of which bears against the valve seat 82 and the other end of which bears against the removable plug 89. Access to the plug 89 is normally denied since it is covered by the upper housing half 12B. The ports in valve seats 82, 83 are in communication at all times with the outlet conduit 14 (Figure 1), while the ports in the valve seats 86, 87 are always in communication with the conduit 15 (Figure 1). The ports in valve seats 84, 85 are always in communication with the high pressure conduit 10. It is noted that the regions 40 and 90 (Figure 2) are in communication with the return conduit 11 through the notched portions 34B, 34C (Figure 4) of the valve 34.

The valve element 34 is normally maintained in its neutral position shown in Figure 2 by the balanced oppositely acting spring pressed pressure plates 91, 92. The manner in which these plates 91, 92 are pressed inwardly in Figure 2 is identical, and for that reason only the means associated with pressure plate 91 is described in detail.

The pressure plate 91 is normally pressed to the right in Figure 2 by the pair of axially arranged coil compression spring 93, 94, one end of which bears against the threaded retaining plug 95 and the other end of which presses against the pressure plate 91. The pressure plate 91 is centrally apertured so that oil under pressure flowing through the port 33 may act on the piston 43 to move the piston to the right under the conditions shown in Figure 3. Such movement of the piston 43 results of course in movement of the connected valve element 34 and piston 42 to cause the spring pressed pressure plate 92 to move to the right in Figure 2. Such movement of the pressure plate 92 continues until, as shown in Figure 3, the annular flange 92A on the pressure plate contacts the plug 95A. When this condition is attained, the oil may flow in the different paths outlined in the first part of this description.

Figures 6, 7:
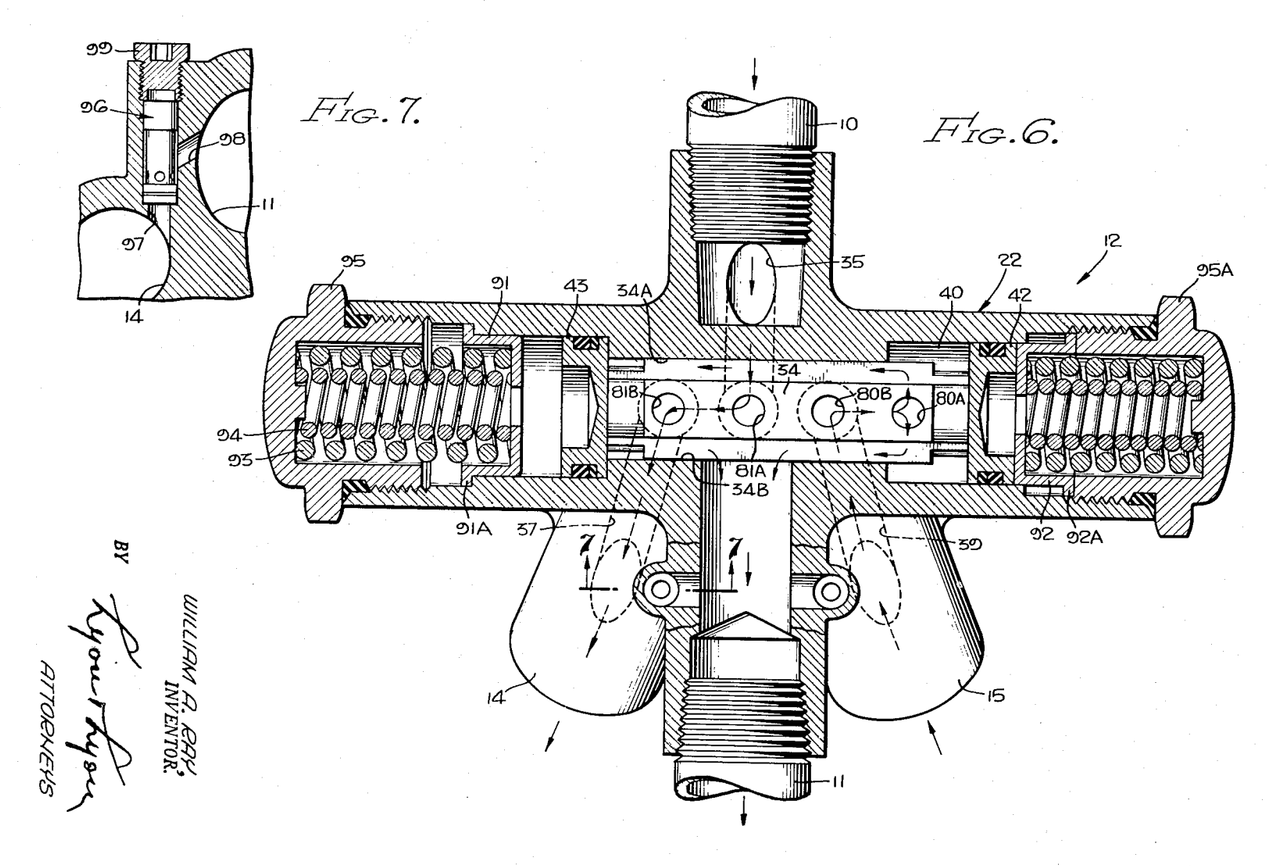
Figure 6 is an irregular sectional view taken as indicated by the lines 6—6 in Figure 4.
Figure 7 is a sectional view taken substantially on the line 7—7 of Figure 6 and serves to show a thermostatically operated relief valve.

It is observed that in the neutral position of the movable selector valve element 34, as shown in Figure 2, the spring pressed valve seats 82, 83, 84, 85, 86, 87 engage a solid portion of the valve element 34 thereby preventing the flow of high pressure oil and also preventing flow of oil from one side of the piston 16 (Figure 1) to the other side, in which case the piston 16 is effectively locked in position. Under this condition, it is desired that some means be incorporated for allowing thermal expansion of the entrapped oil. Such means is shown in Figure 7 and constitutes a conventional so-called thermal relief valve disposed in conduits 97, 98 which serves to interconnect the conduit 14 with the return conduit 11. A similar thermal relief valve (not shown) may be interposed in like manner between the other conduit 15 and the return conduit 11. Such thermal relief valve 96 is normally closed and is automatically opened to relieve excessive pressures in the cylinder connections to the exhaust. Such excessive pressures usually result from thermal expansion of the oil in the cylinder. The valve 96 is of conventional type and forms per se no part of the present invention, and for that reason no detailed description of the same is incorporated herein. The valve 96, however, may be removed as a unit for replacement purposes by removing the threaded plug 99.

Figure 8:
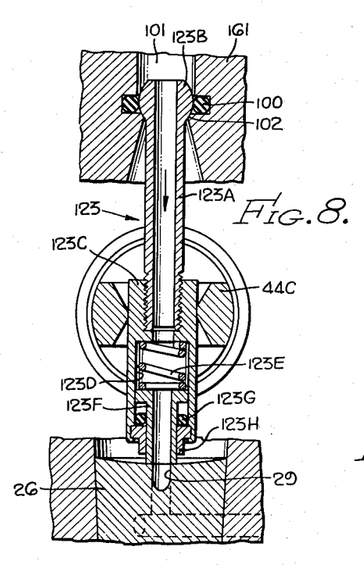
Figures 8, 9 and 10 serve to illustrate different modified arrangements for supporting and mounting the pivoted tubular element of the pilot valve.
Figure 9:
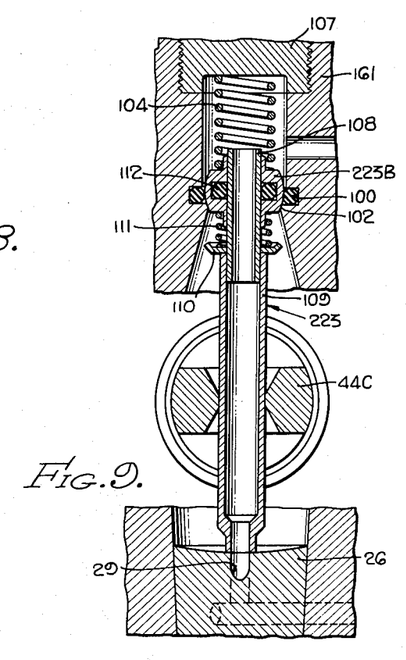
Figures 10, 11:
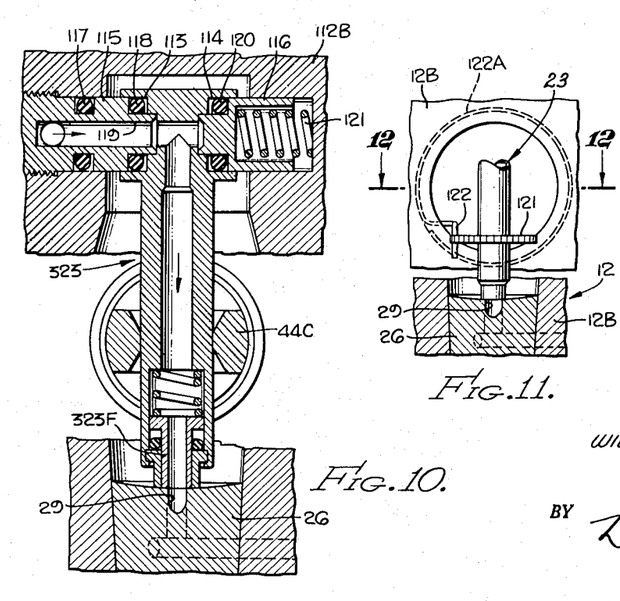
Figures 11 and 12 serve to illustrate a ratchet construction applicable to all of the arrangements shown herein with the exception of Figure 10 for purposes of producing positive lapping of the extremity of the pivoted tubular element with the cooperating cylindrical stationary valve seat, it being noted that Figure 12 is a view taken substantially on the line 12—12 of Figure 11.

Figures 8, 9 and 10 are each directed to different modifications of the pivoted valve element 23. Corresponding parts in these figures have identical reference numerals.

Figure 8 incorporates a ball and socket mounting for the tubular pivoted conduit 123, and the spring for biasing the lower end of the conduit into engagement with the valve seat 26 is enclosed within the structure. More specifically, the tubular conduit 123 comprises an upper tubular portion 123A having a ball-shaped upper end 123B, the lower end being threaded in an annular sleeve 123C which includes a hollow bore 123D for enclosing the coil compression spring 123E, nozzle 123F, O-ring 123G, and retaining ring 123H. The spring 123E presses the nozzle 123F downwardly into engagement with the spherical hardened upper surface of the valve seat 26. Leakage of oil is prevented by the O-ring 123G, and of course the retaining ring 123H serves to retain the O-ring. The upper ball-shaped end 123B cooperates with a mating spherical annular surface in the removable plug 161. An O-ring 100 recessed within the plug 161 resiliently engages the ball-shaped end 163B to provide an oil-tight seal. It is observed that the region designated as 101 above the ball-shaped end 123 is a high pressure area and the high pressure existing therein serves to act on the valve element 123 to press the same into engagement with its spherical portion in the immediate vicinity of the O-ring 100. At the same time, as observed from the structure in Figure 8, the portion 123A may be moved upwardly in the process of assembling and disassembling the same. In other words, the spherical seat 102 for engaging the ball-shaped end 123B allows upward movement of the valve element 123A but prevents further downward movement.

In the arrangement shown in Figure 9, a ball and socket support of the type shown in Figure 8 is incorporated, and in this instance a prestressed coil compression spring 104 serves to press the ball-shaped end 223B into engagement with the spherical seat 102. One end of the spring 104 bears against the plug 107 within the main plug 161. The other end of the spring bears against the ball-shaped end 223B through which the tube 108 passes. The tube 108 is fastened, at its lower end, to the outer telescoped tube 109 and to the cup-shaped spring seat 110. In other words, the elements 108, 109, 110 constitute one unit. A prestressed coil compression spring 111 acts between the ball-shaped end 223B and element 109 to press such tubular element 109 into contact with the upper hardened spherical surface of the valve seat 26. An O-ring 112 recessed within the ball-shaped end 223B provides a seal between such element and the inner tube 108.

In all of the previous arrangements, i. e., the arrangements shown in Figures 3, 8 and 9, the pivoted valve elements 23, 123 and 223, respectively, are allowed to rotate about their own axes when and as they are pivoted, such pivoting movement being produced as explained heretofore on energizing of the solenoids 31, 32, as the case may be, to cause corresponding movement of the common core member 44C. In the arrangement shown in Figure 10, such rotational movement is prevented and only pivoting movement of the movable valve element 323 is permitted. For that purpose, in Figure 10, the tubular valve element 323 is provided at its lower end with a spring biased nozzle 323F (similar to the spring biased nozzle 123F in Figure 8), but the upper end is provided with a pair of radially aligned cylindrical openings 113, 114 for providing hubs for the aligned spaced axial members 115, 116. The axial member 115 comprises a threaded plug with recesses for oil sealing O-rings 117, 118, and such plug 115 is provided with a high pressure oil channel 119 which is in communication with the central bore of the tubular element 323. The other axial member 116 is recessed to accommodate the prestressed coil compression spring 121, one end of which bears against the housing 112B and the other end of which bears against the axial member 116 so that the position of the valve element 323 may be adjusted by turning the threaded plug 115. Such axial member 116 may be provided with an annular shoulder for retaining the O-ring 120 disposed in the opening 114.

Figure 12:
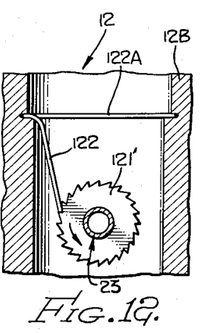

The modification shown in Figures 11 and 12 is applicable to either one of the constructions shown in Figures 3, 8 and 9, and the purpose of the structure shown therein is to provide a positive means whereby the tubular pivoted valve element 23, 123 or 223, as the case may be, is caused to pivot about its own axis upon each operation of the same to thereby provide relative movement between the lower end and valve seat 26. By this expedient, a lapping action is produced so that the seal between the lower end of such pivoted valve element and the valve seat becomes progressively better in the event of course that some mechanical inaccuracy resulted in initial fabrication or assembly. This means, as shown in Figures 11 and 12, constitutes a toothed ratchet wheel 121' mounted on the lower end of either tubular member 23, 123 or 223, as the case may be, the teeth on such wheel cooperating with a spring pressed pawl 122. The pawl 122 is really an extension of an annular ring 122A which is self-retained in an annular groove in the housing 12B. Thus, as observed in Figure 11, upon pivoted movement of the valve element 23, 123 or 223 outwardly of the plane of paper, the pawl 122 rides over the teeth on the wheel 121; but, upon return movement of the valve element back towards the plane of the paper, the pawl 122, engaging the teeth, causes rotational movement of the valve element about its own axis. The pawl and ratchet wheel 122, 121' thus constitute a one-way clutch and assure the lapping of the lower end of the valve element with the valve seat 26.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a valve structure of the character described, a valve casing, said casing having mounted therein a relatively stationary valve seat with a port therein, said valve seat having a surface, a tubular valve element, said tubular valve element having a liquid inlet and a liquid outlet, means pivotally mounting said tubular valve element near one of its ends with the other one of its ends in sealing contacting engagement with said surface of said valve seat, means defining a high pressure conduit in communication with said liquid inlet, means yieldingly pressing at least a portion of said tubular element into engagement with said valve seat, and means for moving said tubular valve element transversely of its longitudinal axis to bring said tubular valve outlet into and out of communication with said port, said portion of said tubular element being mounted for movement generally along the axial direction of said tubular element.

2. The arrangement set forth in claim 1 in which said last mentioned means comprises a pair of oppositely acting electromagnetic means engaging said tubular valve element at a region intermediate the ends thereof for moving said tubular valve element in opposite directions and correspondingly into and out of communication with said port.

3. In a valve structure of the character described, a valve casing, said valve casing having mounted therein a valve seat, said valve seat having an arcuate surface, a tubular valve element having means pressing one end thereof into sealing contacting engagement with said surface, means pivotally supporting said tubular element on said casing near the other end of said tubular element, means defining a conduit in communication with said other end of said tubular element, and said valve seat including at least one port in the surface thereof, with which said one end of the tubular valve element may be placed into and out of communication upon pivotal movement of said tubular valve element.

4. In a valve structure of the character described, a valve casing, said casing having mounted therein a relatively stationary valve seat with a port therein, a tubular valve element, said tubular valve element having a liquid inlet and a liquid outlet at its respective ends, means pivotally mounting said tubular valve element near one of its ends with the other one of its ends in sealing contacting engagement with said valve seat, means for moving said tubular valve element transversely of its longitudinal axis to bring said valve outlet into and out of communication with said port, and means yieldingly pressing said tubular element into sealing engagement with said valve seat.

5. The arrangement set forth in claim 4 in which said mounting means comprises a deformable O-ring, and means stationarily mounting said O-ring with said tubular valve element passing therethrough and resiliently engaged thereby.

6. The arrangement set forth in claim 4 in which said mounting means comprises a ball and socket connection between said valve casing and said one end of said tubular valve element for allowing said tubular valve element to rotate about its own axis, said moving means incorporating means for engaging said valve element to pivotally move the same while yet permitting rotation of said valve element about its longitudinal axis.

7. The arrangement set forth in claim 6 in which said ball and socket connection includes an enlarged circular portion on said tubular element, a first spring acts between said enlarged circular portion and said casing, and said tubular element comprises a pair of telescoped sections with a second spring acting between said enlarged circular portion and one of said telescoped sections to press said one telescoped section into engagement with said valve seat.

8. The arrangement set forth in claim 4 in which said mounting means incorporates means for allowing rotational movement of said tubular element about its own longitudinal axis, said moving means incorporating means for engaging said valve element to pivotally move the same while yet permitting rotation of said valve element about its longitudinal axis.

9. The arrangement set forth in claim 8 in which means are provided for assuring rotational movement of said tubular element about its own longitudinal axis while being moved by said moving means.

10. The arrangement set forth in claim 9 in which said rotational assuring means comprises a one way clutch element mounted on said tubular element cooperating with a relatively stationary clutch element.

11. The arrangement set forth in claim 10 in which said one way clutch comprises a pawl and ratchet.

12. The arrangement set forth in claim 4 in which said moving means comprises a pair of aligned solenoids disposed on opposite sides of said tubular valve element, a pair of solenoids having a common core through an aperture of which said tubular valve element extends.

13. In a valve structure of the character described, a valve casing, said casing having mounted therein a relatively stationary valve seat with a port therein, said valve seat having a curved surface, a tubular valve element, said tubular valve element having a liquid inlet and a liquid outlet at its respective ends, means pivotally mounting said tubular valve element near one of its ends with the other one of its ends in sealing contacting engagement with said surface of said valve seat, means for moving said tubular valve element transversely of its longitudinal axis to bring said valve outlet into and out of communication with said port, the last mentioned means comprising a pair of aligned oppositely acting means engaging said tubular valve element at a region intermediate the ends thereof for moving said valve element in opposite directions.

14. In a valve structure of the character described, a valve casing, said casing having mounted therein a relatively stationary valve seat with a port therein, said valve seat having a curved surface, a tubular valve element with a liquid inlet and a liquid outlet at its respective ends and comprising telescoping members, means pivotally mounting one of said tubular valve members on said casing with the other one of said members in engagement with said surface of said valve seat, means yieldingly pressing said other member into engagement with said valve seat, and means for moving said tubular valve element as a unit transversely of its longitudinal axis to bring said outlet into and out of registry with said port.

15. The arrangement set forth in claim 14 in which said mounting means comprises an O-ring which is disposed between said casing and said valve element and which serves also as a pressure seal between said inlet and said outlet.

16. In a valve structure of the character described, a valve casing, said casing having mounted therein a relatively stationary valve seat with a port therein, said valve seat having a curved surface, a tubular valve element with a liquid inlet and a liquid outlet at its respective ends, means pivotally mounting said tubular valve element near one of its ends with the other one of its ends in engagement with said surface of said valve seat, said mounting means comprising an O-ring serving at least in part as a pivot for said valve element and disposed between said casing and said valve element to provide a pressure seal between said inlet and said outlet, and means for moving said tubular valve element transversely of its longitudinal axis to bring said outlet into and out of communication with said port.

17. In a valve structure of the character described, a valve casing, said casing having mounted therein a relatively stationary valve seat with a port therein, said valve seat having a curved surface, a tubular valve element with a liquid inlet and a liquid outlet at its respective ends, an O-ring disposed between said casing and said valve element pivotally mounting said tubular valve element near one of its ends with the other one of its ends in engagement with said surface of said valve seat, and means for moving said tubular valve element transversely of its longitudinal axis to bring said outlet into and out of registry with said port.

18. In a valve structure of the character described, a valve casing, said casing having mounted therein a relatively stationary valve seat with a port therein, a tubular valve element having a liquid inlet and a liquid outlet at its respective ends, means pivotally mounting said tubular valve element near one of its ends with the other one of its ends in sealing contacting engagement with said valve seat, a high pressure chamber in said casing in communication with said inlet, said mounting means including pressure sealing means between said chamber and said port, and means for moving said tubular valve element transversely of its longitudinal axis to bring said outlet into and out of communication with said port.

19. The arrangement set forth in claim 1 in which said valve seat is tapered and fits in a tapered opening in said casing and is pressed therein by said pressing means.

20. In a valve structure of the character described, a valve casing, said casing having mounted therein a valve seat with a pair of ports therein, a tubular valve element having opposite ends thereof defining an inlet and an outlet respectively, a chamber in communication with said inlet, a deformable member circumscribing and engaging an intermediate portion of said valve element and being disposed between said casing and said valve element to allow pivoting movement of said valve element with respect to said valve seat, said deformable member serving as a pressure seal between said chamber and said port, and a pair of aligned oppositely acting means engaging said valve element at a region intermediate said deformable member and said outlet to move said valve element into and out of communication with either of said ports.

21. In a valve structure: a casing; an elongated tubular valve element; means for pivotally mounting said tubular element adjacent one of its ends in an opening in said casing for arcuate movements in a plane; sealing means between the tubular element and the wall of said opening; means on said casing providing a valve seat having a surface so disposed that it is engageable by the other end of the tubular element and curved to conform to the path of arcuate movement of that end; said seat having a port extending to said surface and in said path of movement of said other end of the tubular element; means for maintaining the tubular element continuously in sealing engagement with said surface during said movements of the element; and power-operated means for selectively moving the element abruptly into and out of communication with said port.

References Cited in the file of this patent

UNITED STATES PATENTS

| | | |
|---|---|---|
| 1,395,203 | Olsen | Oct. 25, 1921 |
| 1,442,973 | Russell | Jan. 23, 1923 |
| 1,755,057 | Fagan | Apr. 15, 1930 |
| 1,966,264 | Roye | July 10, 1934 |
| 2,020,286 | Bittle | Nov. 12, 1935 |
| 2,074,882 | Wunsch | Mar. 23, 1937 |
| 2,247,301 | Lesser | June 24, 1941 |
| 2,308,662 | Von Manteuffel | Jan. 19, 1943 |
| 2,350,808 | Peglau | June 6, 1944 |
| 2,409,517 | Schmit | Oct. 15, 1946 |
| 2,433,405 | Stamm | Dec. 30, 1947 |
| 2,448,649 | Adams | Sept. 7, 1948 |